United States Patent [19]

Enomoto et al.

[11] Patent Number: 5,444,343
[45] Date of Patent: Aug. 22, 1995

[54] METHOD AND APPARATUS FOR NUMERICALLY CONTROLLING INDUSTRIAL MACHINE

[75] Inventors: Minoru Enomoto, Ohbu; Toshio Aono, Kariya; Fumihiko Komuro, Aichi; Tsuyoshi Yamamoto; Katsuhisa Tanaka, both of Toyota; Tomoyuki Ohtake, Okazaki, all of Japan

[73] Assignees: Toyoda Koki Kabushiki Kaisha, Kariya; Toyota Jidosha Kabushiki Kaisha, Toyota, both of Japan

[21] Appl. No.: 216,441

[22] Filed: Mar. 23, 1994

[30] Foreign Application Priority Data

Mar. 24, 1993 [JP] Japan .................................. 5-065708
Nov. 2, 1993 [JP] Japan .................................. 5-274495

[51] Int. Cl.$^6$ ............................................. B25J 9/18
[52] U.S. Cl. .............................. 318/568.11; 318/569; 318/568.2; 318/567
[58] Field of Search ............ 318/568.2, 568.11, 568.12, 318/569, 568.21, 595

[56] References Cited

U.S. PATENT DOCUMENTS

| | | | |
|---|---|---|---|
| 4,992,712 | 2/1991 | Fujimoto et al. | 318/569 |
| 5,220,263 | 6/1993 | Onishi et al. | 318/568.12 |
| 5,241,250 | 8/1993 | Nagasawa et al. | 318/568.2 |
| 5,254,923 | 10/1993 | Kanitani | 318/568.11 |
| 5,298,844 | 3/1994 | Nagasaki et al. | 318/568.11 |
| 5,331,264 | 7/1994 | Cheng et al. | 318/568.11 |

FOREIGN PATENT DOCUMENTS

| | | |
|---|---|---|
| 0103714 | 3/1984 | European Pat. Off. . |
| 0347467 | 12/1989 | European Pat. Off. . |
| 0371143 | 6/1990 | European Pat. Off. . |
| 62-49503 | 3/1987 | Japan . |
| 1-169608 | 7/1989 | Japan . |

*Primary Examiner*—William M. Shoop, Jr.
*Assistant Examiner*—Karen Masih
*Attorney, Agent, or Firm*—Oblon, Spivak, McClelland, Maier, & Neustadt

[57] ABSTRACT

A numerical controller for an industrial machine such as a robot and an assembling system utilizing plural robots. The numerical controller controls movements of plural movable portions of the industrial machine by a synchronous control in which plural movable portions are moved in a synchronized manner. Based on an operational program, the numerical controller identifies a movable portion or movable portions which must be moved independently from other movable portion. The identified movable portion or portions are moved by an independent control. On the other hand, movable portions which are not designated are moved by synchronous control. Further, plural groups of movable portions may be formed for the synchronous control. In this case, movable portions in each group are controlled in a synchronized manner independently from other groups.

10 Claims, 17 Drawing Sheets

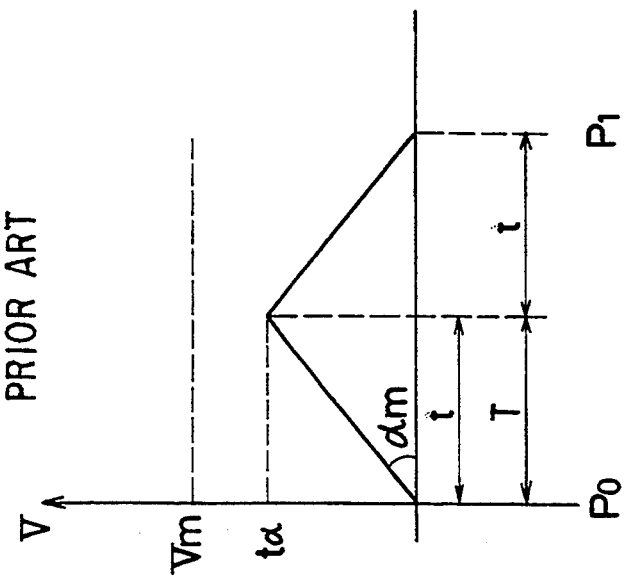
FIG. 1 (b) PRIOR ART
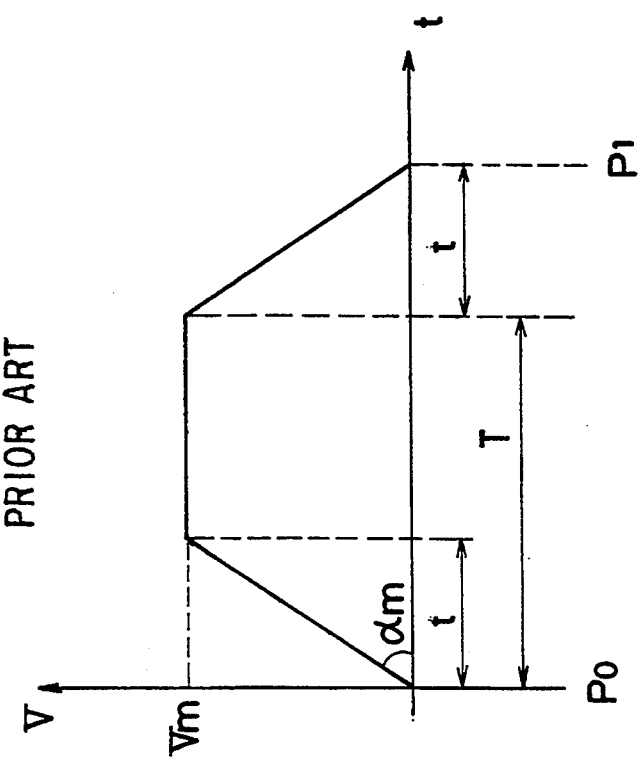
FIG. 1 (a) PRIOR ART (a) i-TH AXIS (b) j-TH AXIS

FIG. 5

| | | TEACHING POINTS | | | | |
|---|---|---|---|---|---|---|
| | | J(0) | J(1) | J(2) | J(3) | J(4) |
| CONTROL AXES | 1ST AXIS | $\theta_{01}$ | $\theta_{11}$ | $\theta_{21}$ | $\theta_{31}$ | $\theta_{41}$ |
| | 2ND AXIS | $\theta_{02}$ | $\theta_{12}$ | $\theta_{22}$ | $\theta_{32}$ | $\theta_{42}$ |
| | 6TH AXIS | $\theta_{06}$ | $\theta_{16}$ | $\theta_{26}$ | $\theta_{36}$ | $\theta_{46}$ |
| | 7TH AXIS | $\theta_{07}$ | $\theta_{17}$ | $\theta_{27}$ | $\theta_{37}$ | $\theta_{47}$ |

FIG. 10(a)

```
 10    MOVE    J [0]
 20    TASK    1  ON/1
 30    TASK    2  ON/1
 40    TASK    3  ON/1
 50    TASK    4  ON/1
 60    TASK    5  ON/1
 70    TASK    6  ON/1
 80    TASK    7  ON/1
 90    MOVE    J [1]
100    MOVE    J [2]
110    SYNC    1, 0
120    SYNC    2, 0
130    SYNC    3, 0
140    SYNC    4, 0
150    SYNC    5, 0
160    SYNC    6, 0
170    SYNC    7, 0
180    TASK    1  OFF
190    TASK    2  OFF
200    TASK    3  OFF
```

FIG. 15(a)

```
10      TASKS    1 ON/0
20      TASKS    2 ON/0
30      TASKS    3 ON/0
40      TASKS    4 ON/1
50      TASKS    5 ON/1
60      TASKS    6 ON/1
70      TASK     7 ON/0
80      MOVE     J [0]
90      MOVE     J [1]
100     DRIVE    7 500
110     SYNC     11, 0
120     SYNC     22, 0
130     SYNC      7, 0
140     TASKS    1 OFF
150     TASKS    2 OFF
160     TASKS    3 OFF
170     TASKS    4 OFF
180     TASKS    5 OFF
190     TASKS    6 OFF
200     TASK     7 OFF
```

FIG. 15(b)

```
210    MOVE     J [2]
220    TASK     7 ON/0
230    MOVE     J [3]
240    MOVE     J [4]
250    DRIVE    7 -500
260    SYNC     7, 0
270    TASK     7 OFF
280    END
```

METHOD AND APPARATUS FOR NUMERICALLY CONTROLLING INDUSTRIAL MACHINE

BACKGROUND OF THE INVENTION

1. Field of the Invention

The present invention relates to methods and apparatus for numerically controlling industrial machines such as robots and machine tools.

2. Discussion of Related Art

In a conventional industrial machine such as an articulated robot (hereinafter referred to as "robot") having plural movable portions which correspond to plural control axes and which are simultaneously moved to obtain a desired operation, a hand or the like thereof is moved to pass through predetermined plural teaching points. In such a control system, each movable portion is controlled in accordance with a trapezoidal velocity pattern, as shown in FIG. 1(a) during the time when the hand or the like is moved between two adjacent teaching points. Namely, a maximum velocity Vm and a maximum acceleration em are set for each control axis taking account of the characteristics of a servomotor used for driving a movable portion corresponding to the control axis. When the movable portion is moved from a teaching point P0 to a teaching point P1, it is accelerated at the maximum acceleration am after the departure from the teaching point P0, as shown in FIG. 1(a). When the velocity reaches the maximum velocity Vm after a lapse of $\tau$ seconds, the movable portion is constantly moved at the velocity Vm. When T seconds which is a period of time defining the timing of starting deceleration (the timing will hereinafter be referred to as "deceleration start time") has elapsed, the movable portion is decelerated at a deceleration corresponding to the maximum acceleration am so that the movable portion reaches the teaching point P1. In the case where a deceleration start time T comes before the velocity reaches the maximum velocity Vm even if the acceleration is made at the maximum acceleration am, a triangular velocity pattern shown in FIG. 1(b) is generated to control the velocity of the movable portion.

Although the velocity pattern for each control axis is generated in the above-described manner, the velocity pattern is modified so that the hand or the like of the robot is moved along a moving locus which smoothly connects the plural teaching points. This makes it possible for an operator to easily image the moving locus. To obtain such a smooth locus, all of the movable portions must simultaneously start their movements, and must stop their movements at the same time. Further, it is common that the movable portions are controlled to simultaneously initiate their accelerations and decelerations and to simultaneously end their accelerations and decelerations. Namely, a velocity pattern is individually determined for each of control axes based on the corresponding maximum velocity and maximum acceleration, and is then modified in such a way that all of the movable portions simultaneously start and stop their movements, and that they simultaneously begin and end acceleration and deceleration. This control is referred to as "synchronous control" in this specification. The synchronous control will be described in detail with reference to FIG. 2. For making the description simpler, only the case where the velocities of all the movable portions are controlled in accordance with trapezoidal velocity patterns will be explained. First, velocity patterns are determined for all the control axes, respectively. For i-th axis, a velocity pattern having an acceleration/deceleration time $\tau i$, a deceleration start time Ti and a completion time ti is set based on a maximum velocity Vi and a maximum acceleration $\alpha i$, as shown in the section (a) of FIG. 2. Similarly, a velocity pattern having an acceleration/deceleration time $\tau j$, a deceleration start time Tj, and a completion time tj is set for j-th axis, based on a maximum velocity Vj and a maximum acceleration $\alpha j$, as shown in the section (b) of FIG. 2. After velocity patterns have been determined for other control axes in the same way, a control axis whose deceleration start time is the latest is selected. Assuming the case where the deceleration start time Ti of the i-th axis is the latest, the maximum velocities in other control axes are modified based on the deceleration start time Ti. For example, in the j-th axis whose amount of movement is $\Delta Sj$, the maximum velocity is reset to a modified maximum velocity Vj' calculated by the following expression:

$$Vj' = \Delta Sj/Ti.$$

Subsequently, the acceleration/deceleration time is also modified based on the modified maximum velocity Vj'. The modified acceleration/deceleration time $\tau j'$ is calculated by the following expression:

$$\tau j' = Vj'/\alpha j,$$

wherein $\alpha j$ is the maximum acceleration of the j-th axis.

After the maximum velocities and acceleration/deceleration times of all the control axes are modified, a control axis whose acceleration/deceleration time is the longest among all the control axes is selected. Assuming the case where the acceleration/deceleration time $\tau j'$ of the j-th axis is the longest, the accelerations in other axes are modified in such a way that their velocities reach their modified maximum velocities over the acceleration/deceleration time $\tau j'$. For example, in the i-th axis, the modified acceleration $\alpha i'$ is calculated by the following expression:

$$\alpha i' = Vi'/\tau j'.$$

In this case, since the deceleration start time Ti is a reference point in time for the deceleration start times in all the control axes, as mentioned above, Vi' is equal to Vi'.

When the modification of the maximum velocities, accelerations and acceleration/deceleration times in all the control axes have been completed, all of the movable portions corresponding to the control axes are controlled to start deceleration at the deceleration start time Ti, and to accelerate and decelerate over the acceleration/deceleration time $\tau j'$, as illustrated by broken lines in FIG. 2.

When all the movable portions are controlled in the above-mentioned manner, the movable portions complete their movements at the same point in time $(Ti + \tau j')$. Accordingly, the points ti' and tj' in time at which movements in the i-th and j-th axes have completed are expressed as follows:

$$ti' = tj' = Ti + \tau j'.$$

The above-described control method is effective for cases where the hand or the like of the robot is required to accurately trace a predetermined moving locus. However, in cases where the accuracy of the moving locus is not demanded, but the hand or the like must be moved through the teaching points at a high speed, the above-described control method brings about drawbacks that the capacities of servomotors for all the control axes cannot be fully utilized, and that time losses are produced.

For example, in the i-axis shown in the section (a) of FIG. 2, the acceleration is modified form $\alpha i$ to $\alpha i'$ which is smaller than $\alpha i$. Therefore, the time required to complete the movement in the case where the i-th axis is moved in accordance with the velocity pattern which is modified for synchronous control and which is illustrated by the broken line becomes longer, by the time $\Delta ti$ ($=ti'-ti$), than the time required to complete the movement in the case where the i-th axis is independently moved in accordance with the velocity pattern illustrated by the solid line. Further, in the J-axis shown in the section (b) of FIG. 2, the acceleration is modified form $\alpha j$ to $\alpha j'$ which is smaller than $\alpha j$. Therefore, the time required to complete the movement in the case where the j-th axis is moved in accordance with the velocity pattern which is modified for synchronous control and which is illustrated by the broken line becomes longer, by the time $\Delta tj$ ($=tj'-tj$), than the time required to complete the movement in the case where the j-th axis is independently moved in accordance with the velocity pattern illustrated by the solid line.

SUMMARY OF THE INVENTION

An object of the present invention is to provide improved methods and apparatus for numerically controlling an industrial machine such as a robot, which is capable of controlling a selected movable portion or portions of the industrial machine independently from other movable portions which are moved in a synchronized manner, thereby increasing the operational speeds of the industrial machine.

Another object of the present invention is to provide improved methods and apparatus for numerically controlling industrial machines such as robots, in which plural groups of movable portions are defined, and movable portions belonging to each group are moved in a synchronized manner independently from other groups during the time when a movable portion or portions which do not belong to the groups are independently moved.

Briefly, in the present invention, information which designates at least one movable portion to be excluded from synchronous control is first obtained to identify the designated movable portion. The designated movable portion is moved in a predetermined manner independently from other movable portions which are not designated. On the other hand, the other movable portions which are not designated are moved in a synchronized manner.

Accordingly, one or more selected movable portions of the industrial machine can be controlled independent from other movable portions which are controlled by synchronous control. Therefore, the selected movable portion or portions can be moved at a higher speed.

Further, since the selected portion or portions can be controlled independently from other movable portions, the selected portion or portions can perform special movements or operations which are not related to other movable portions. This enhance the flexibility of the industrial machine.

In accordance with another aspect of the invention, at least two groups of movable portions are defined for synchronous control. In this case, movable portions belonging to each group is moved in a synchronized manner independent from the other group, and simultaneously with this, at least one designated movable portion is moved in a predetermined manner independently from the above-mentioned groups.

Accordingly, plural groups of movable portions can independently be controlled by synchronous control during the time when the designated movable portion or portions are moved independently from the groups. Therefore, the movable portions of the industrial machine can be controlled axis by axis and group by group, so that the control can be made in the most efficient way which reflects the operational state of the industrial machine.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 1(a) and 1(b) are explanatory charts showing velocity patterns used in a conventional velocity control;

FIG. 5 is a table showing teaching data used in the first and second embodiments of the present invention;

Figure 10B:
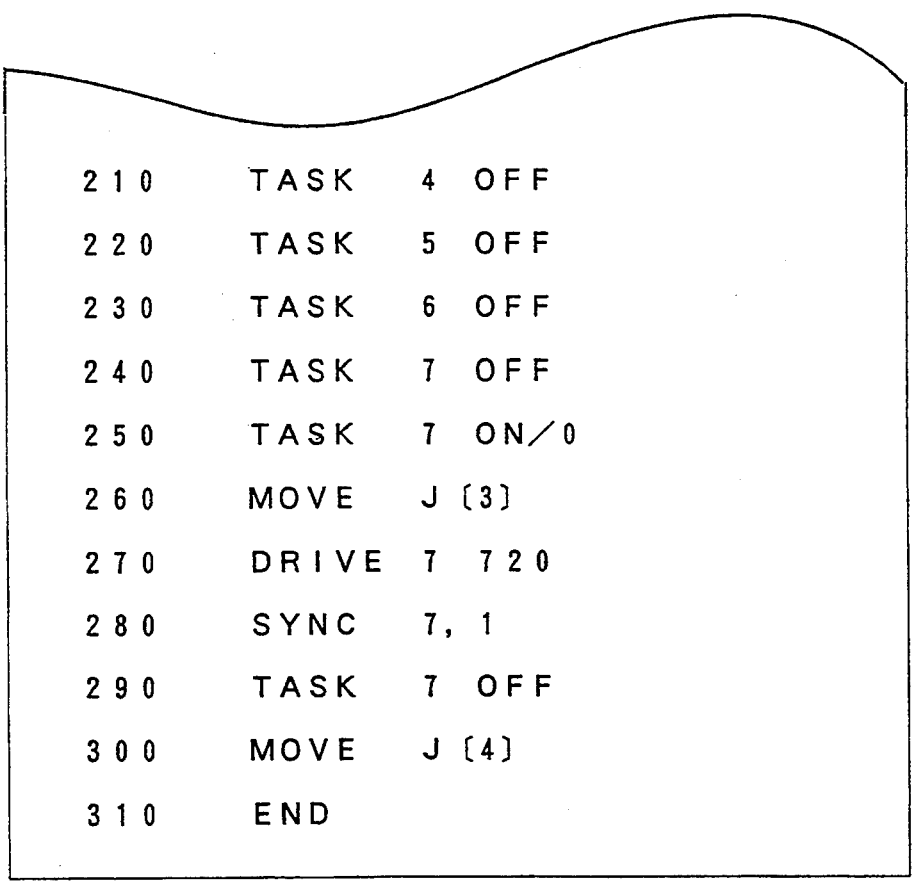
Figure 11:
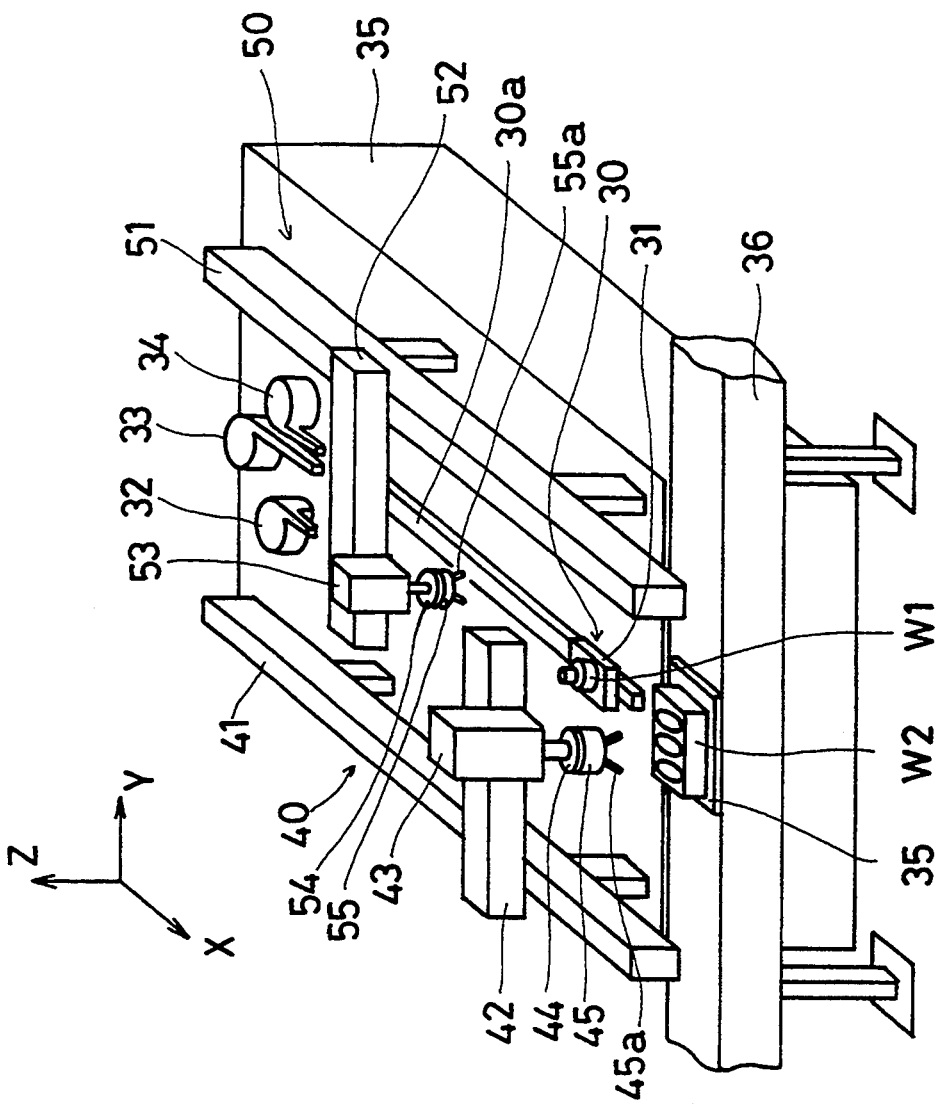
Figure 12:
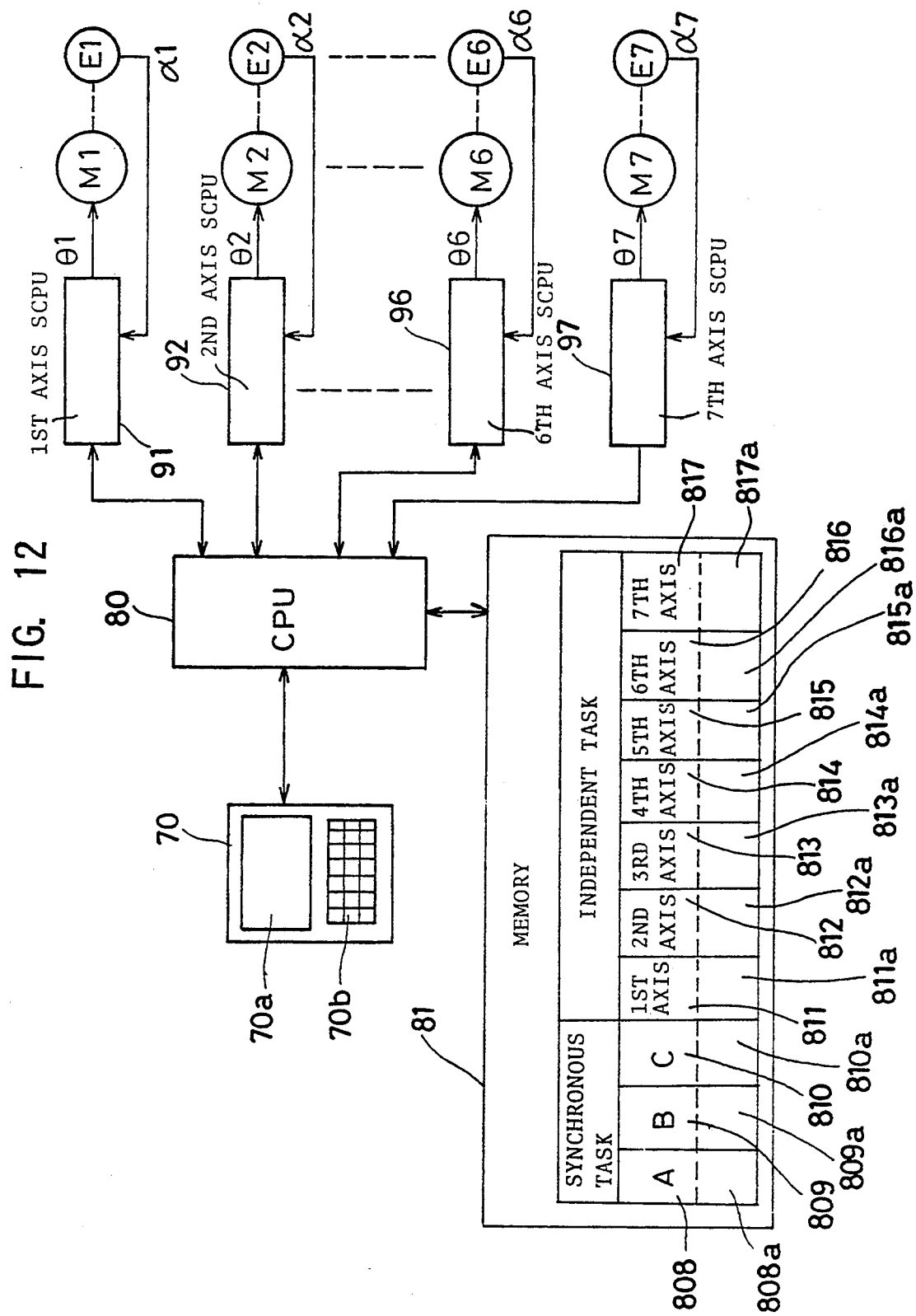
Figure 13:
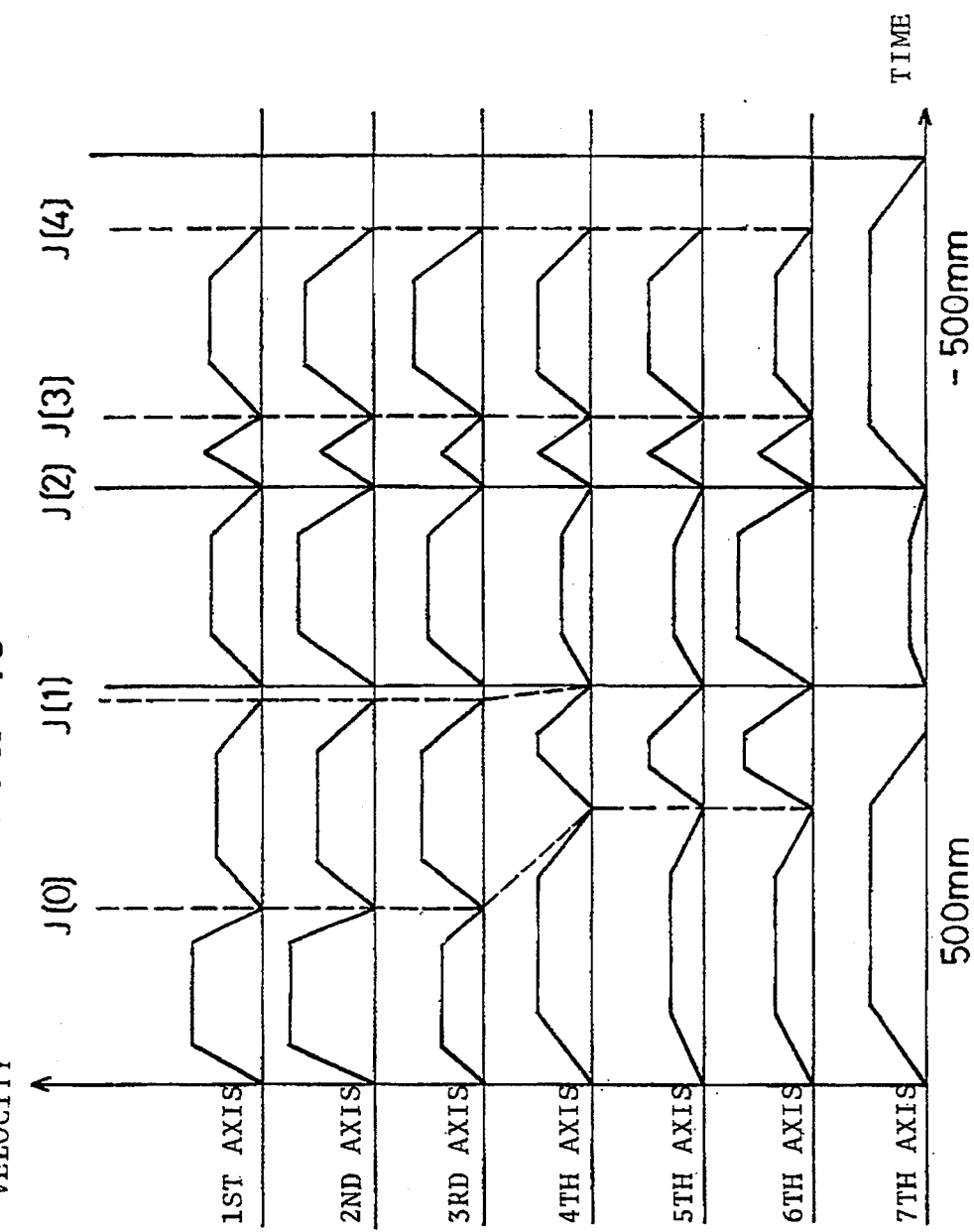
Figure 14:
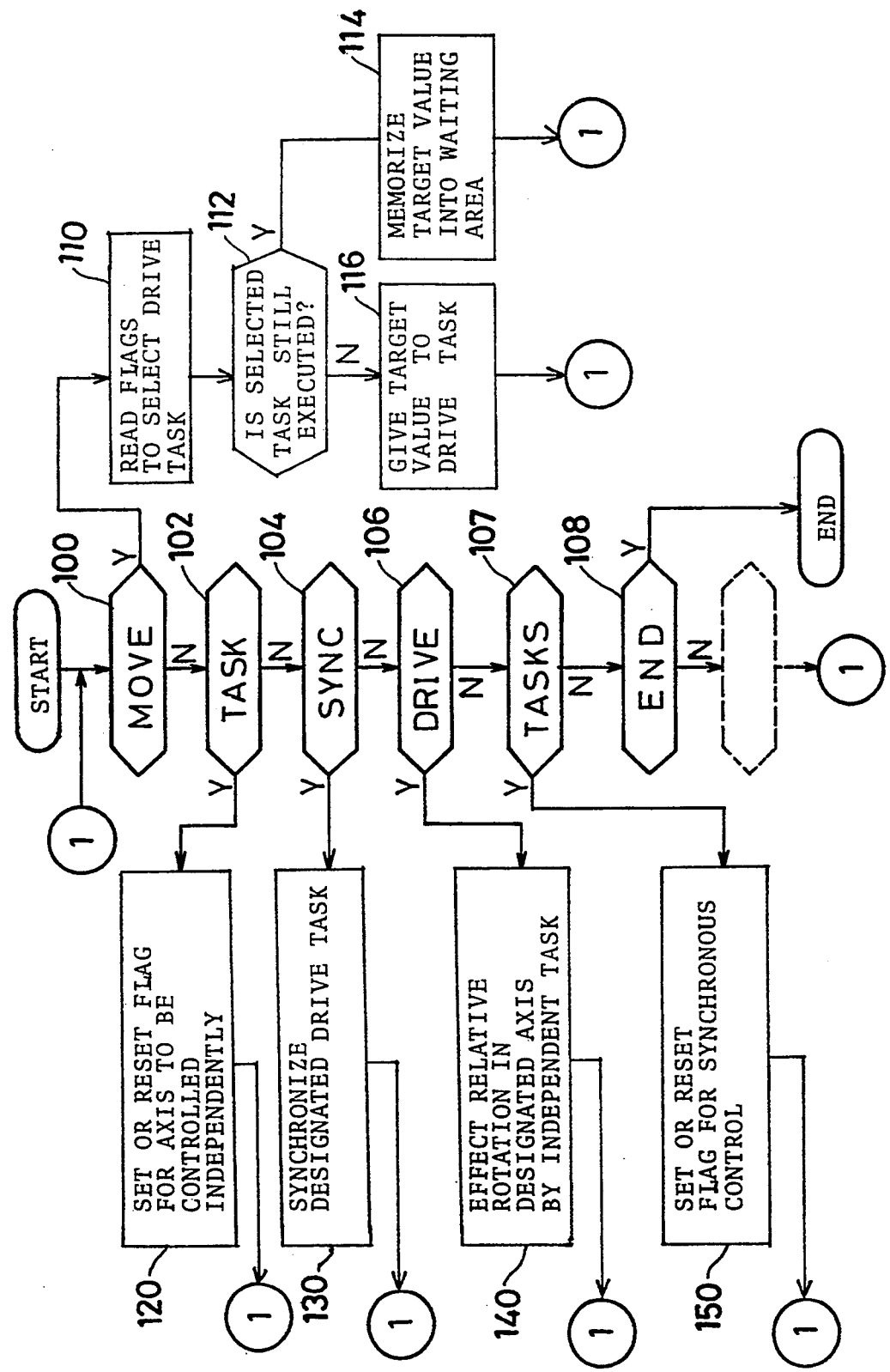

FIGS. 10(a) and 10(b) are charts showing an operational program used in the first embodiment;

FIG. 11 is a perspective view showing a robot system used in the second embodiment of the present invention;

FIG. 12 is a block diagram showing a numerical controller according to the second embodiment of the present invention;

FIG. 13 is a time chart for explaining the operation of the numerical controller according to the second embodiment;

FIG. 14 is a flowchart showing the operation of the numerical controller according to the second embodiment for decoding instructions; and FIGS. 15(a) and 15(b) are chars showing an operational program used in the second embodiment.

DETAILED DESCRIPTION OF PREFERRED EMBODIMENTS

The present invention will now be explained with reference to the attached drawings.

FIRST EMBODIMENT

Figure 2:
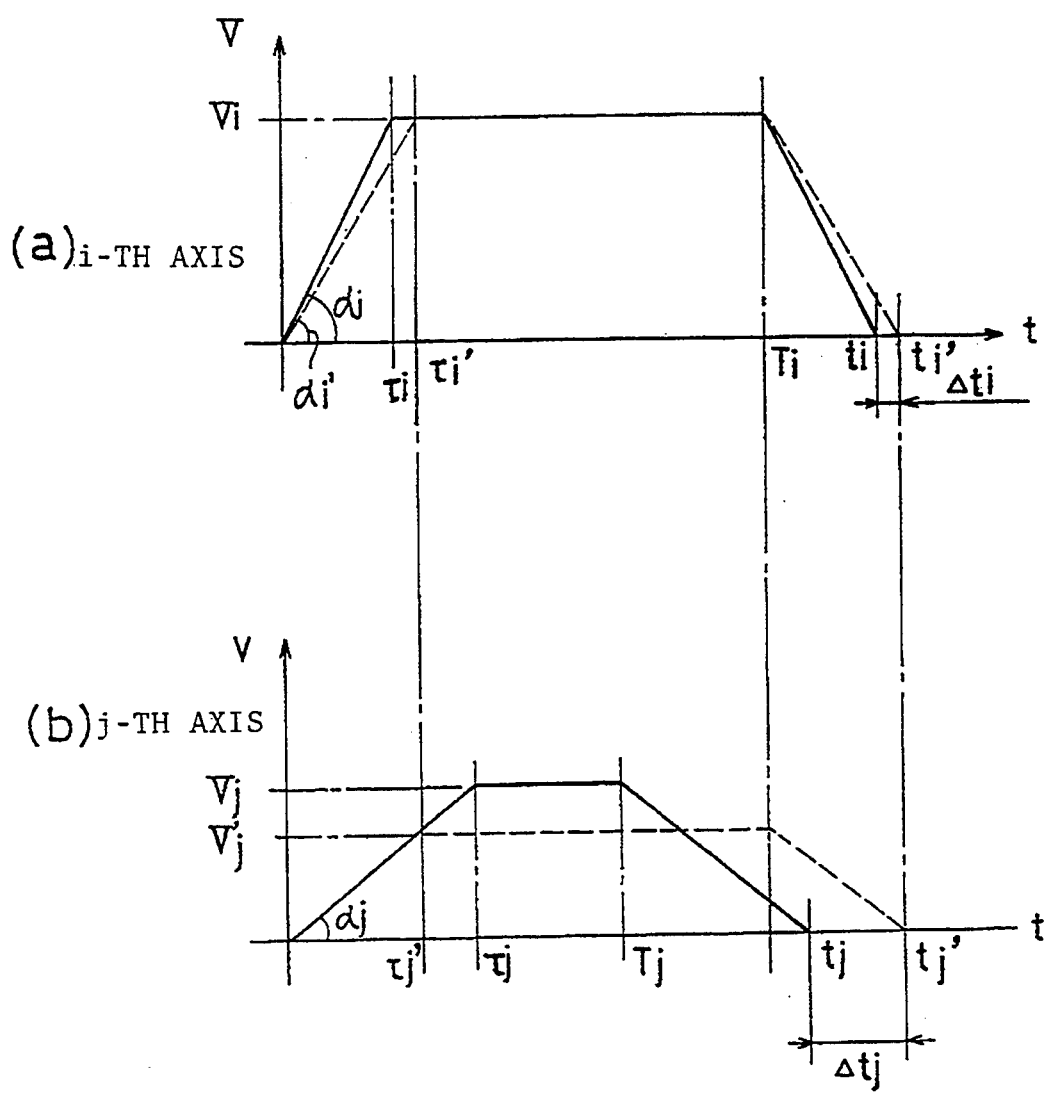
FIG. 2 is an explanatory chart showing a conventional synchronous control.
Figure 3:
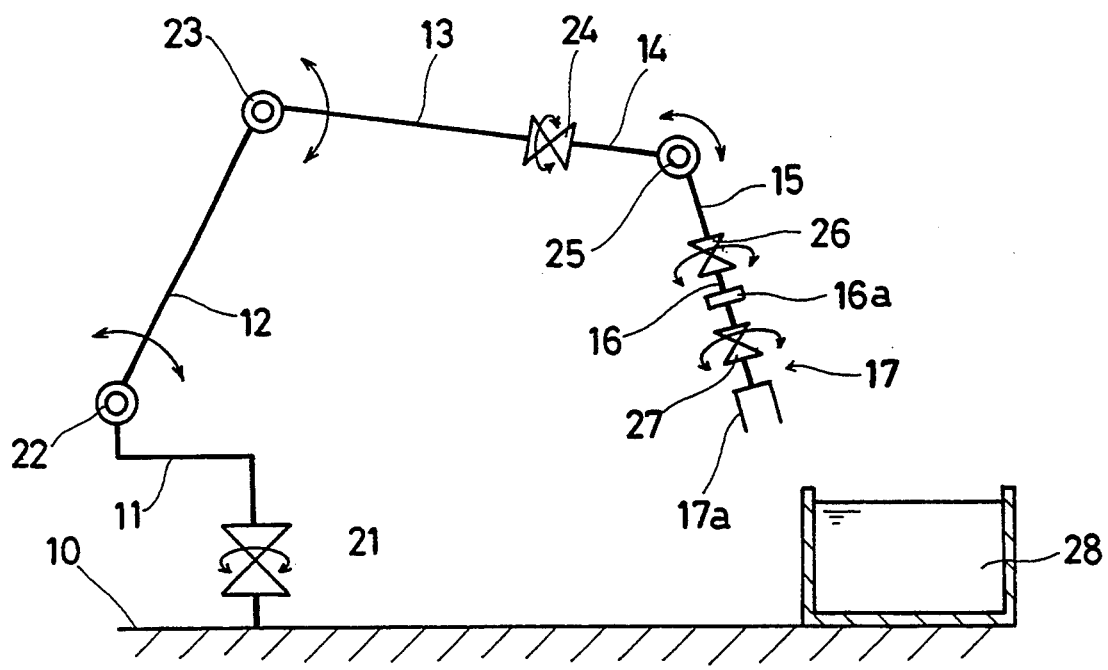
FIG. 3 is a schematic view showing a robot used in a first embodiment of the present invention.

FIG. 3 is a schematic view showing a robot controlled by a numerical controller according to a first embodiment of the present invention. The robot has such a structure that a hand is attached to a conventional articulated robot of a 6-axis type, and the hand is provided with a grip mechanism whose rotation is controlled by an additional control axis. Therefore, the robot has seven control axes.

A rotator 11 of the robot is supported on a fixed base 10 via a first joint 21 for rotational movement about a vertical axis. A first arm 12 is supported on the rotator 11 via a second joint 22 for swing movement about a horizontal axis. A second arm 13 is supported on the first arm 12 through a third joint 23 for swing movement about a horizontal axis. At the forward end of the second arm 13, a twist wrist 14 is supported via a fourth joint 24 for rotational movement about the center axis of the second arm 13. A bend wrist 15 is supported on the twist wrist 14 via a fifth joint 25 for swing movement about an axis perpendicularly intersecting the rotational axis of the twist wrist 14. A swivel wrist 16 is carried by the bend wrist 15 via a sixth joint 26 for rotational movement about an axis coaxial with the rotational axis of the bend wrist 15. Further, a hand 17 is attached to the flange 16a formed at the forward end of the swivel wrist 16. The hand 17 is provided with a grip mechanism 17a for grasping a workpiece. The grip mechanism 17a is carried by the hand 17 via a seventh joint 27 and is rotatable about an axis coaxial with the swivel wrist 16. Numeral 28 denotes a water tank placed on a side of the robot. The robot is used to dip a griped workpiece into water in the water tank 28, and then move the workpiece while rotating the workpiece by rotating the grip mechanism 28 so that the workpiece is washed. Accordingly, the robot according to the present embodiment has seven movable portions which rotate or swivel about the above-mentioned joints. The seven movable portions are driven by seven servomotors M1–M7 which will be described later.

Figure 4:
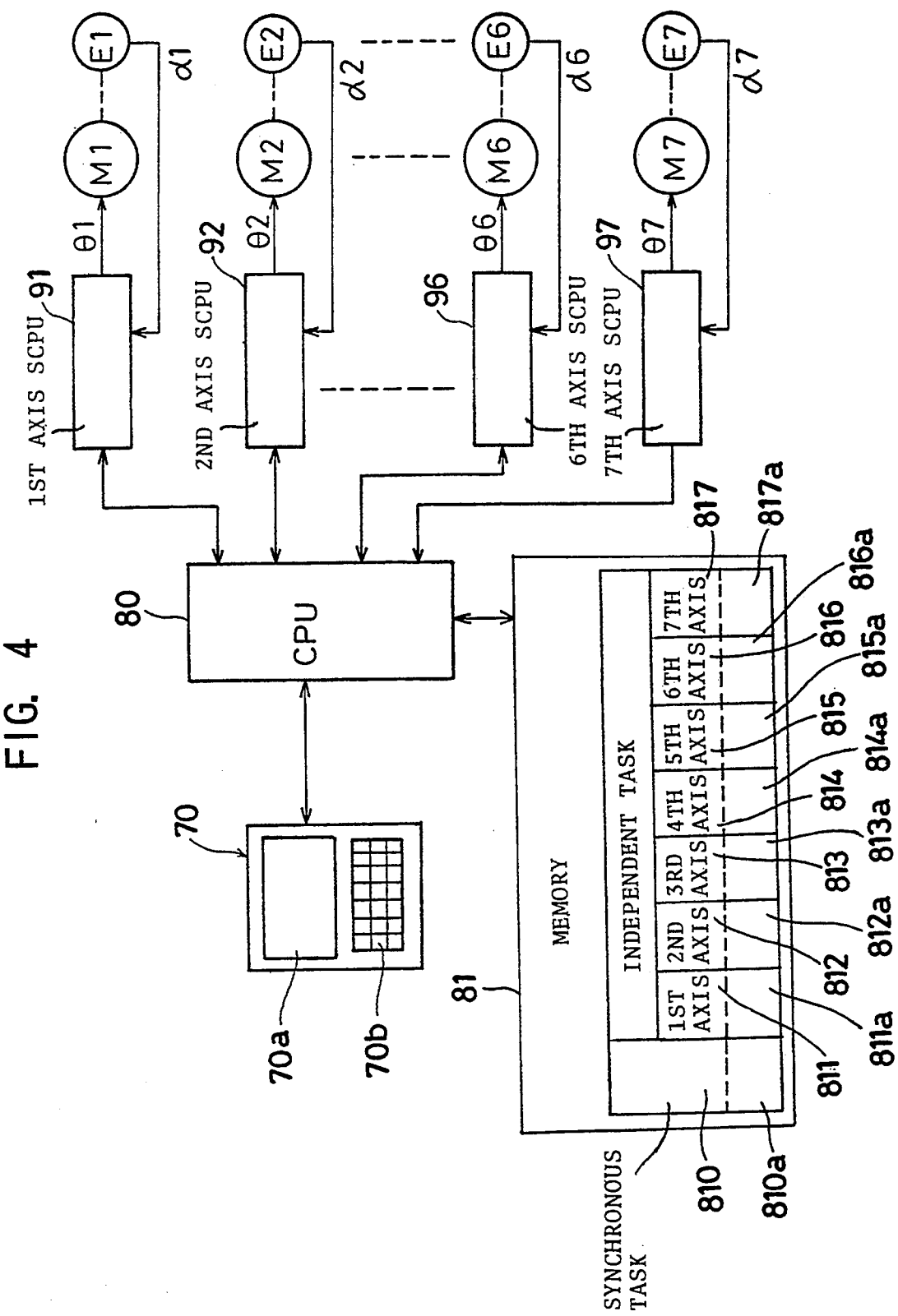
FIG. 4 is a block diagram showing a numerical controller according to the first embodiment of the present invention.

Next, the structure of a numerical controller according to the present embodiment will be described with reference to FIG. 4. The numerical controller is used for controlling movements of the above-mentioned seven movable portions of the robot. The numeral 80 denotes a central processing unit (CPU). Connected to the CPU 80 are a memory 81, servo CPUs 91–97 and a teaching box 70.

The memory 81 includes various memory areas such as a program area for storing an operational program for controlling the robot, and a data area for storing teaching data and other necessary data. In the program area, there are memorized eight drive tasks 810–817 which are used for moving the movable portions to respective target positions which will be described later. The eight drive tasks 810–817 is composed of a single synchronous task 810, and seven independent tasks 811–817 which correspond to seven control axes, namely, correspond to the seven movable portions of the robot. Eight waiting areas 810a–817a corresponding to the eight drive tasks are formed in the memory 81 for storing next target values for the eight drive tasks.

The servo CPUs 91–97 are provided for controlling the servomotors M1–M7 corresponding to 1st to 7th control axes, and operate to calculate differences between target rotational angles $\theta1-\theta7$ and outputs $\alpha1-\alpha7$ from encoders E1–E7 coupled to the servomotors M1–M7, and to rotate the servomotors M1–M7 at velocities corresponding to the calculated differences.

The teaching box 70 is used for carrying out teaching operations and for inputting the operational program, and is provided with a display 70a for displaying an operational program and a keyboard 70b for inputting a command for starting a movement of the robot and the operational program.

The operation of the numerical controller according to the first embodiment will now be described.

In the memory 81, teaching data shown in FIG. 5 are previously input through the teaching box 70. The teaching data indicate plural teaching points which will become reference points in a moving locus. In this example, there are five teaching points J[0]–J[4], and angles $\theta$mn of the movable portions are detected when the grip mechanism of the robot is moved to each of the teaching points. Thus detected angles are memorized as target values or teaching data. The angles are relative angles from original angles which are output from the encoders E1–E7 when the movable portions are positions at their original or reference positions. The letter "m" affixed to represents the number of each teaching point and is an integer from 0 to 4, while the letter "n" represents the number of each control axis and is an integer from 1 to 7.

Next, the operation of the CPU 80 will be described with reference to FIGS. 6 through 10(b).

The numerical controller according to the present embodiment operates to select or designate one or more control axes in accordance with a command called "TASK" and to independently control the selected control axis or axes in accordance with a command called "MOVE" or a command called "DRIVE". The numerical controller controls control axes which are not selected or designated by TASK commands by conventional synchronous control. An operational program shown in FIGS. 10(a) and 10(b) are written using these commands. The operational program is successively decoded by the command decoding program shown in FIG. 8. When a MOVE command or DRIVE command is decoded by the command decoding program, a corresponding drive task is effected so as to move a corresponding movable portion. The processing cycle of the CPU 80 is composed of plural processing periods, and the processing periods are assigned to the command decoding program and the eight drive tasks 810–817, respectively, so that the command decoding program and drive tasks are executed in parallel.

Figure 8:
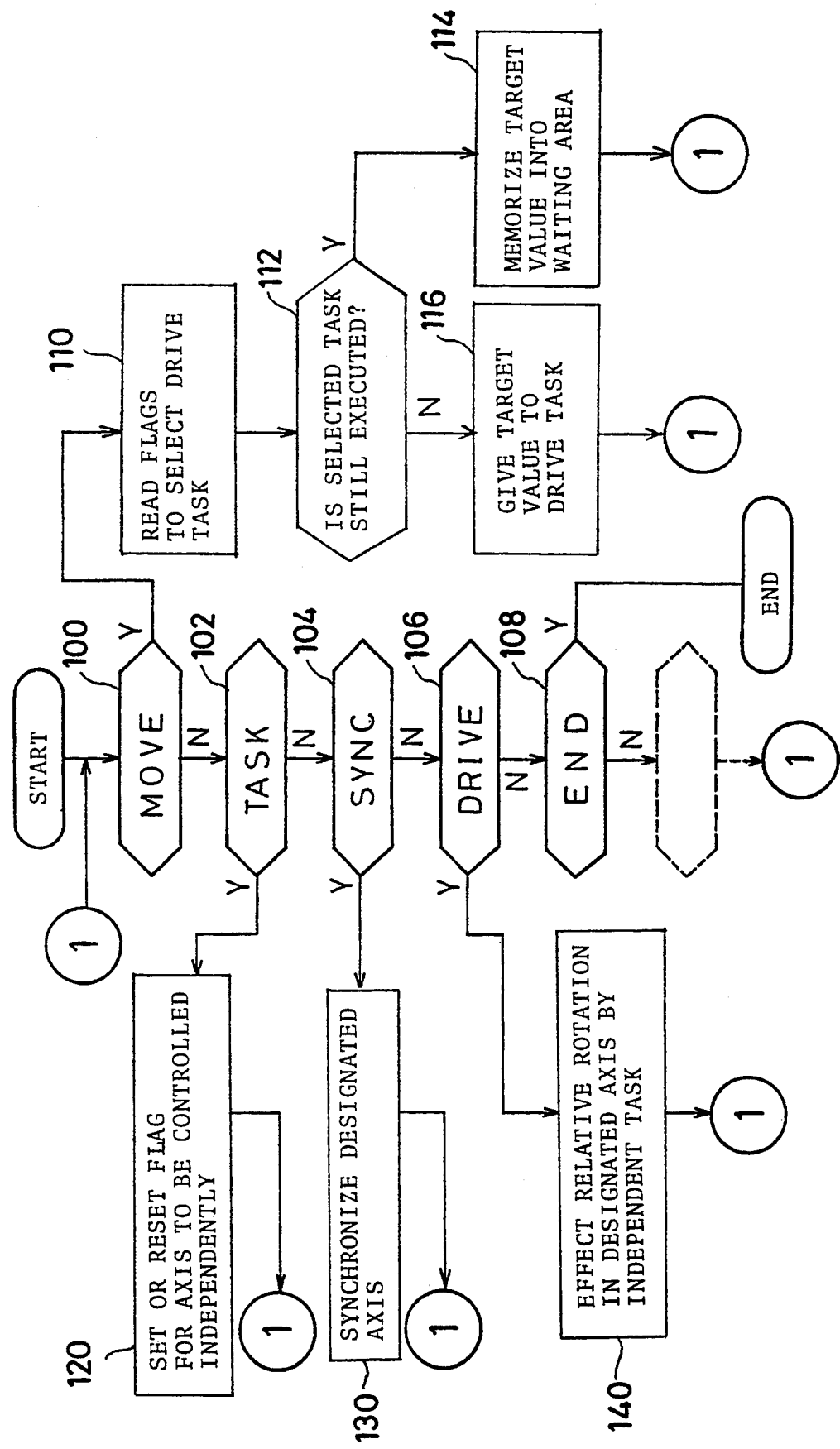
FIG. 8 is a flowchart showing the operation of the numerical controller according to the first embodiment for decoding instructions.

The processing for the MOVE command, which is an important command in this embodiment, will now be described with reference to FIG. 8 and FIG. 9. The MOVE command is used together with the number of a teaching point, by describing as MOVE J[0], as shown in the line 10 of the operational program.

The MOVE command is decoded in step 100, and processing for the MOVE command is executed in steps 110 through 116. In step 110, the statuses of control flags formed in the memory 81 are read so as to select a desired drive task or tasks from the drive tasks 810–817 based on the statuses of the control flags. Namely, when it is judged based on the status of the control flags that the 1st through 6th axes must be controlled by synchronous control, and only the 7th axis must be controlled by independent control, the synchronous task 810 and the independent task 817 are selected. TASK command is used for setting and resetting the control flags corresponding to the control axes so as to designate the kinds of control mode for each control axis. The kinds of control are classified roughly into two control modes. One of the control modes is independent control, which is carried out for designated control axis or control axes whose control flags are in set state. The other control mode is synchronous control, which is carried out for control axis or control axes whose control flags are in reset state. The independent control includes two modes. In one mode, a target value is given by a single axis control command such as DRIVE command which will be described later. In another mode, a target value is given by MOVE command. The TASK command is described as follows:

TASK p ON/q, or TASK p OFF, where p is the number of a control axis for which independent control must be carried out, and q is a parameter. When the description TASK p ON is read out, independent control is designated for p-th control axis, and the designation of the independent control for the p-th control axis is canceled when the description TASK p OFF is read out. When the designation of the independent control is canceled, the p-th control axis is controlled by synchronous control. The parameter q indicates the manner in which a target value is given to the independent task. When q=0, a target value is given using a single axis control command. When q=1, a target value is given using MOVE command without using the single axis control command. Although the single axis control command gives a target value in a manner different from that in the MOVE command, it selects the same independent task regardless of the value of the parameter p if the single axis control command designates a control axis which is also designated by the MOVE command.

In step 112, it is judged whether or not the drive task or drive tasks selected in step 110 are presently executed. When the selected drive task or drive tasks are presently executed, or when the result of the judgment is affirmative, it is impossible to effect a movement commanded by the MOVE command. In this case, the processing moves to step 114, in which the target value or target values are stored in a corresponding waiting areas. For example, in the case where the present MOVE command for movement toward a teaching point J[1] is executed by the synchronous task 810, which is still executed in accordance with the preceding MOVE command for movement toward the teaching point J[0], the movement toward J[1] cannot be started. In such a case, the target values of the teaching point J[1] are stored in the waiting areas 810a for the synchronous task 810, which makes it possible to start the movement toward J[1] immediately after the termination of the movement toward J[0].

On the other hand, when the selected drive task or drive tasks are not presently executed, or when the result of the judgment in step 112 is negative, the target values of the present MOVE command are given to the corresponding drive task, or tasks.

Figure 9:
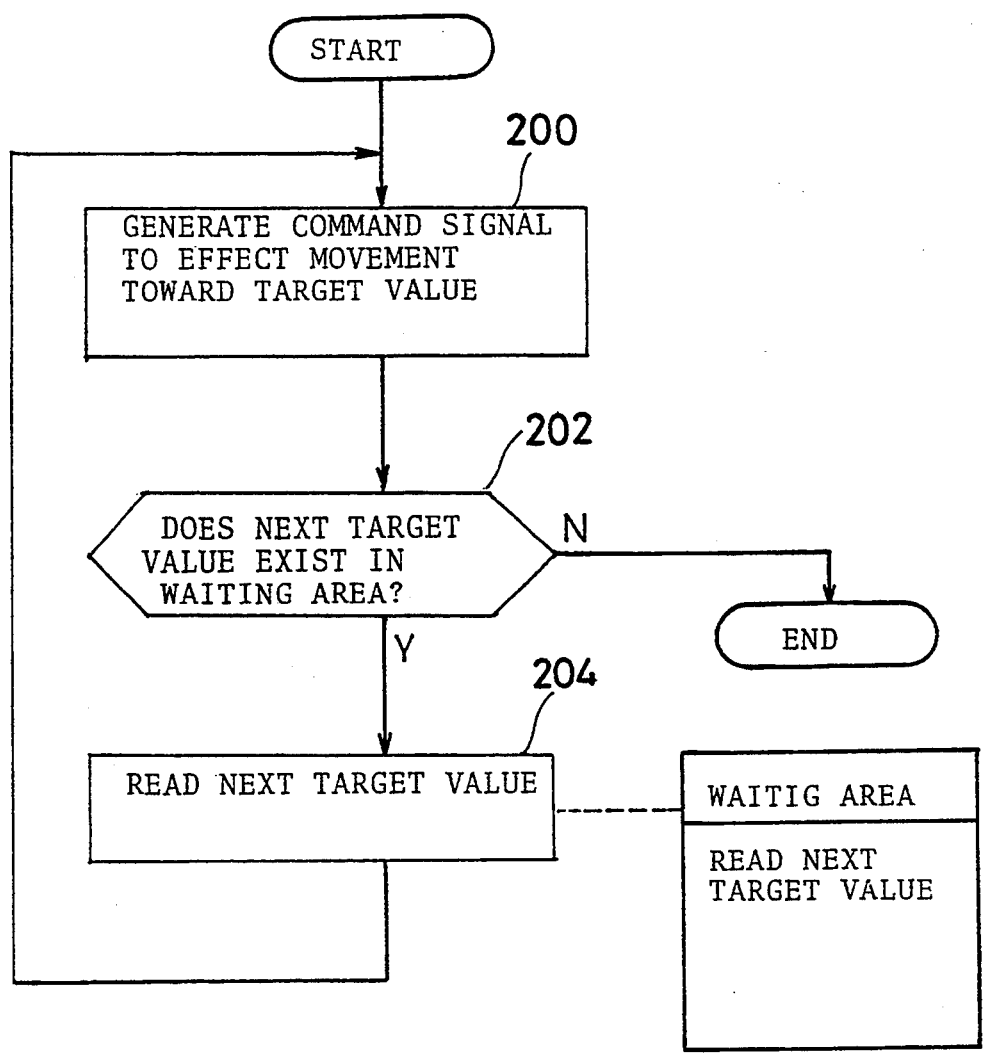
FIG. 9 is a flowchart showing the operation of the numerical controllers according to the first and second embodiments for moving movable portions.

The flowchart shown in FIG. 9 shows the processing for executing each of the drive tasks 810–817 to which target values are given in steps 114 and 116. As will be explained below, the processing for each of the drive tasks 810–817 is basically the same.

In step 200, a velocity pattern is first calculated which is used for moving a movable portion to a target position corresponding to a target value given in step 116, and command signals are generated based on the velocity pattern. Namely, for the synchronous task 810, a velocity pattern in each control axis is calculated based on the maximum velocity and maximum acceleration which are determined based on a servomotor used for the corresponding control axis, and teaching data, i.e., a distance between the present position to a next teaching point designated by a command. Subsequently, the velocity patters are modified, by using a control axis in which the deceleration start time is the latest, and a control axis in which the acceleration/deceleration time is the longest as reference axes. Command angles are generated for all the control axes based on the modified velocity patterns.

For each of the independent tasks 811–817, a velocity pattern is determined based on the maximum velocity and maximum acceleration set for the corresponding independent axis, without being affected by the maximum velocities and maximum accelerations of other control axes. Therefore, it is possible to generate command angles which maximally use the capacities of the servomotors, thereby increasing the moving speeds of the movable portions.

After the completion of the processing in step 200, the processing moves to step 202, in which it is judged whether or not a next target value exists in a corresponding one of the waiting areas 810a–817a for the drive tasks 810–817. When a next target value exists in the corresponding one of the waiting area 810a–817a, or the result of the judgment in step 202 is affirmative, the processing moves to step 204 in which the next target value is read out from the corresponding waiting area. The processing then moves back to step 200 so that command angles are generated in step 200 based on the read out target value. When a next target value does not exist in the corresponding one of the waiting area 810a–817a, or the result of the judgment in step 202 is negative, the processing for the drive tasks is ended. As described above, the drive tasks 810–817 are independently initiated.

Next, the processing for the operational program shown in FIGS. 10(a) and 10(b) will be described with reference to the flowchart shown in FIG. 8.

The operational program shown in FIGS. 10(a) and 10(b) is programmed in such a way that all the movable portions of the robot corresponding to 1st through 7th axes are controlled by synchronous control until the grip mechanism of the robot reaches a teaching point J[0], and are then controlled by independent control during the time when the grip mechanism is moved from the teaching point J[0] to a teaching point J[2]. At the teaching point J[2], all the movable portions are synchronized. Subsequently, all the movable portions are moved toward a teaching point J[3], during which the movable portions corresponding to the 1st through 6th control axes are controlled by synchronous control and the movable portion corresponding to the 7th axis is controlled by independent control. After that, synchronization is again carried out for 7th axis, and all the movable portions are moved to target values of a teaching point J[4] by synchronous control so as to compete the movement.

In the above-described movement, the synchronous control used for movements toward the teaching points J[0], the movement from the teaching point J[2] to the teaching point J[3] and the movement from the teaching point J[3] to the teaching point J[4] is generally utilized for causing the grip mechanism or the like of the robot to trace a desired moving locus. The independent control used for movements from the teaching point J[0] to the teaching point J[2] is generally utilized for causing the grip mechanism or the like of the robot to move at a high speed. The combined movement from the teaching point J[2] to the teaching point J[3] in which the grip mechanism of the robot is moved toward the teaching point J[3] while the grip mechanism is independently rotated is utilized for such a work as dipping a workpiece in the water in the water tank 28 while rotating the workpiece so as to wash the workpiece. Part of the operational program such as program for grasping the workpiece and the like which is not related directly to the present invention is omitted from the operational program.

Figure 6:
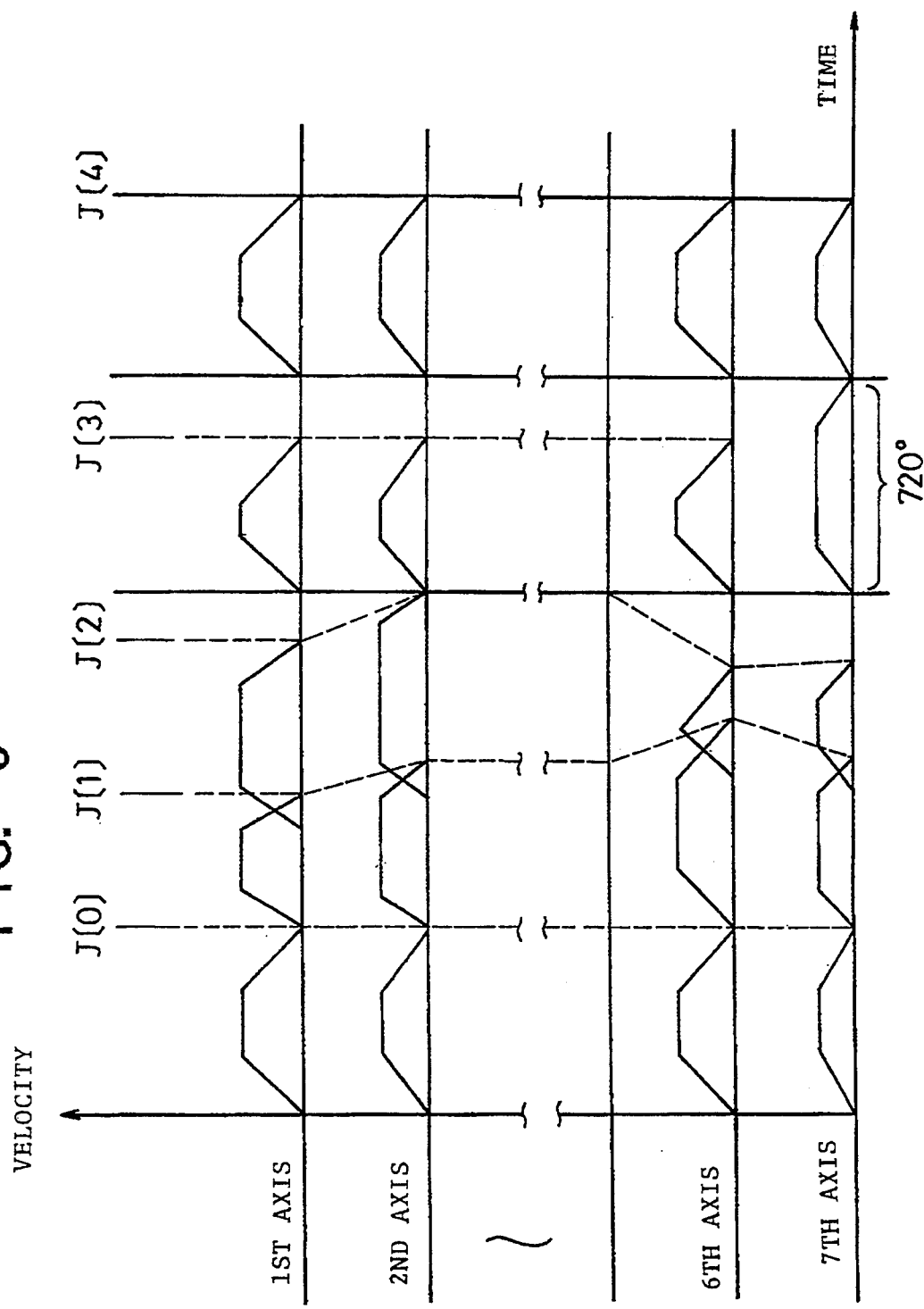
FIG. 6 is a time chart for explaining the operation of the numerical controller according to the first embodiment.

The MOVE command in the line 10 of the operational program is decoded in step 100 so that the grip mechanism or the like is moved to a designated teaching point J[0] by the above-described processing in steps 110-116. In this case, no TASK commands are programmed before the description MOVE J[0], i.e. no control axes are designated for independent control, it is judged in step 110 that all the movable portions corresponding to 1st through 7th axes must be controlled by synchronous control. Therefore, the synchronous task 810 is started to synchronously control all the control axes so that the grip mechanism or the like of the robot is moved to the teaching point J[0]. In this synchronous control, all the movable portions are controlled in such a way that their acceleration/deceleration times and deceleration start times coincide with each other, as shown in FIG. 6. Therefore, all the movable portions simultaneously terminate their movements when the grip mechanism or the like reaches the teaching point J[0].

When the description TASK p ON/q (p=1-7, q=1) in each of the lines 20 through 80 is decoded in step 102, the processing moves to step 120 in which control flags in the memory 81 which correspond to the 1st through 7th control axes are all set so as to memorize a desired control state where all the movable portions must be controlled by independent control. Since the parameter q is "1", it is also memorized that target values are given as a teaching point specified by the MOVE command. Since the CPU 80 is programmed not to execute any TASK command until the movements in all the control axes are completed, the independent control in accordance with the description in the line 90 is not started during the time when the synchronous control is carried out in accordance with the MOVE command in the line 10. For example, when a movable portion corresponding to the 1st axis is controlled by the synchronous task 810 together with other movable portions, the independent task 811 for the 1st axis is not started.

The MOVE commands in the lines 90 and 100 are decoded in step 100 in a manner similar to the MOVE command in the line 10, and the below-described process is carried out in steps 110-116. Since the control modes of all the movable potions are set to independent mode by the TASK commands before the description MOVE J[1], the independent tasks 811-817 are started, and the movable portions are independently moved using the teaching points J[1] and J[2], respectively, as target values. Since the execution of the MOVE command in the line 90 is carried out immediately after the execution of the TASK commands, non of the drive tasks 810-817 have been stared. Accordingly, the result of the judgment in step 112 becomes negative, and the respective target values or target angles of the teaching point J[1] are given to the independent tasks 811-817, and these tasks are then started. When the MOVE command in the line 100 is decoded, the movement toward the teaching point J[1] has not been completed, i.e., the independent tasks 811-817 are still executed. Therefore, the result of judgment in step 112 becomes affirmative. In this case, the target values of the teaching point J[2] are stored in the waiting areas 811a-817a for the independent tasks 811-817, in step 114.

When the movement toward the teaching point J[1] has been completed in the above-mentioned manner, the target values of the teaching point J[2] are read out, and the movement toward the teaching point J[2] is subsequently effected. As shown in FIG. 6, the timing of starting the movement toward the teaching point J[2] differs axis by axis. In detail, since the movement in each control axis is carried out in accordance with a corresponding velocity pattern which is independently determined based on the capacity of the servomotor, i.e., based on the preset maximum velocity and the maximum acceleration, the time which is required to reach the corresponding target position differs axis by axis. Accordingly, the timing at which each of the drive tasks reads a next corresponding target value in step 204 also differs axis by axis, and the timing of staring the movement toward the teaching point J[2] therefore differs axis by axis. Also, the timing at which the movement toward the teaching point J[2] is completed differs axis by axis. As is understood from FIG. 6, the timing of starting the movement in each control axis toward the teaching point J[1] is set to coincide with the timing at which deceleration is started in the movement in the control axis toward the teaching point J[1].

The SYNC commands in the lines 110 through 170 are decoded in step 104, and executed in step 130. The SYNC command is used for eliminating differences in timings at which the movements in the control axes toward a next teaching point are started so as to synchronize a certain control axis with other axes. In the present embodiment, the movement toward the teaching point J[3] must be carried out by controlling the 1st through 6th axes by synchronous control. Therefore, the all the control axes are synchronized when the movement toward the teaching point J[2] has been completed.

In the description SYNC i, j used for the SYNC command, i indicates the number of a control axis used as a reference axis, and j is a parameter. When the SYNC command is fetched, the drive tasks 810-817 are not executed until the i-th axis falls in the state designated by the parameter J. The parameter j can be one of the following values:

0: A timing when movement in the designated axis ends;

1: A timing when output of command signals for the designated axis is completed;

2: A timing when the designated axis starts deceleration; and

3: A timing when a combined movement is started in the designated axis.

Figure 7:
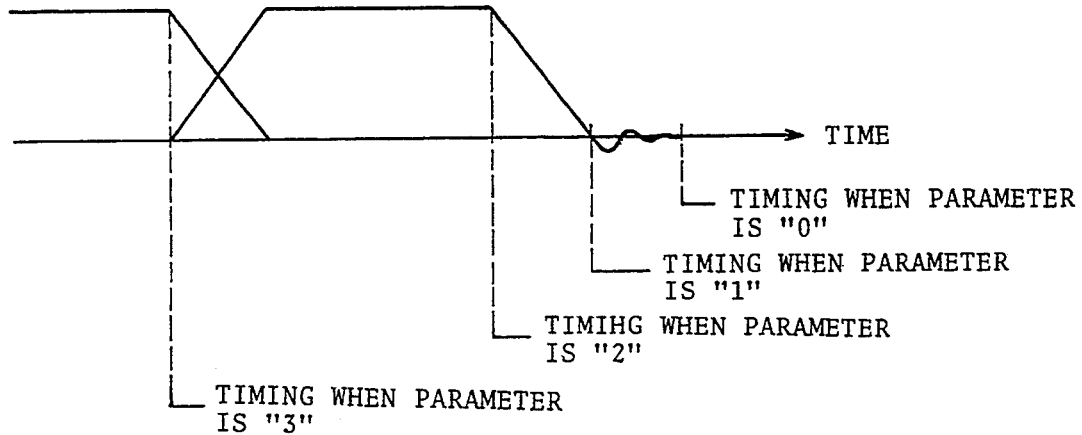
FIG. 7 is a time chart showing plural possible timings for synchronization.

These four parameters are used for carried out synchronization at timings shown in FIG. 7. When the parameter is 0, a next command is executed when the angular position detected by the encoder of the designated axis completely coincides with a commanded rotational angle indicated by a target value. When the parameter is 1, a next command is executed when the CPU 80 stops outputting command signals indicating commanded rotational angles. When the parameter is 2, a next command is executed when the designated axis starts deceleration. When the parameter is 3, a next command is executed when combining of the velocity patters is started in the designated axis for continuously carrying out a movement toward a next teaching point.

In the present embodiment, since the parameters for all the control axes are set to "0", a next command is not executed until the angular positions in all the control axes coincide with respective angular positions corresponding to the target values. Since the movable portion corresponding the 2nd control axis takes the longest time to reach the teaching point J[2], as shown in FIG. 6, synchronization is carried out by using the 2nd axis as a reference axis.

The description TASK p OFF (p=1-7) in each of the lines 180 through 240 is decoded in step 102. The processing then moves to step 120 in which control flags in the memory 81 which correspond to the 1st through 7th control axes are all reset so as to memorize the control state where independent control for all the movable portions has been canceled. The description TASK 7 ON/0 for TASK command in the line 250 indicates that the movable portion corresponding to the 7th control axis is to be moved by independent control. In this case, since the parameter is "0", it is also memorized that the 7th axis is controlled by a single axis control command, i.e, the DRIVE command in the line 270. As mentioned above, by the TASK commands in the lines 180–250, it is memorized that the 1st through 6th axes must be controlled by synchronous control, and the 7th axis must be controlled by independent control using a single axis control command instead of a MOVE command.

The MOVE command in the line 260 is executed in a manner similar to that for the above-mentioned MOVE command, based on the statuses of the control flags which are set by the TASK commands in the lines 180 through 250. In detail, since the movable portions corresponding to the 1st through 6th axes must be controlled by synchronous control, the synchronous task 810 is selected and is executed. As a result, the movable portions corresponding to the 1st through 6th axes are moved toward the respective target values of the teaching point J[3].

Subsequently, the DRIVE command in the line 270 is decoded in step 106, and is executed in step 140. The DRIVE command is a single axis control command, and is described as follows:

DRIVE a, b wherein "a" represents the number of a designated axis, and "b" represents a target value. When "a" is 7, "b" is 720, the movable portion corresponding to the 7th axis is relatively rotated from the present position by 720° using the independent task 817. Another example of the single axis control command is ADRIVE command used for absolute rotation. The description ADRIVE 7 180 means a rotational movement in the 7th axis to the position of 180° in the absolute coordinate system of the robot.

Due to the SYNC commands, the execution of the operational program is temporarily halted until the movements of all the control axes toward the teaching point J[2] have been completed, as shown in FIG. 6. Subsequently, movements in accordance with the above-mentioned control commands in the lines 260 and 270 are started. Namely, the synchronous task 810 is started by the command in the line 260 so that the movements in the 1th through 6th axes are started using the target values of the teaching point J[3]. When the DRIVE command in the line 270 is executed, the independent task 817 is started so that the movable portion corresponding to the 7th axis is rotated by 720° independently from other movable portions. Accordingly, the synchronous task 810 started by the command in the line 260 is executed in parallel with the independent task 817 started by the command in the line 270. With these movements, the workpiece held by the grip mechanism of the robot is dipped in the water in the water tank 28, and is then rotated by the rotational movement of 720° in the 7th axis so that the workpiece is washed.

After the workpiece has been washed in the water tank 28, the grip mechanism is moved to the teaching point J[4] which is the terminal point of the successive movements. In detail, due to the SYNC command in the line 280 which is accompanied by a parameter "1", the drive tasks for the 1st through 6th axes are kept in waiting state until output of command signals for the 7th axis is completed. When the output of command signals has completed, the independent control for the 7th axis is canceled by the TASK command in the line 290. Subsequently, all the movable portions of the robot are controlled by synchronous control in a manner similar to that in the movement according to the command in the line 10 so that the grip mechanism of the robot is moved to the teaching point J[4]. When the END command in the line 310 is decoded in step 108, the operation of the robot is ended.

As described above, in the numerical controller according to the present invention, movable portions for which synchronous control must be carried out and a movable portion or movable portions for which individual control must be carried out can be independently designated. Accordingly, in the case where a high accuracy is required in terms of the moving locus of the robot, the movable portions are moved by synchronous control. Further, in the case where the accuracy of the moving locus of the robot is not important, the movable portions are moved by independent control to increase the operational speed of the robot.

Further, since one or more selected movable portions of the industrial machine can be controlled independent from other movable portions, it is possible to cause the selected portion or portions of the robot to perform a special operation, such as washing of workpiece, which are not related to other movable portions. This enhances the flexibility of the robot.

Moreover, in the numerical controller according to the present embodiment, the differences in timings at which movements of the movable portions of the robot are completed can be eliminated by the SYNC command. Further, since the timing of starting a next movement can arbitrarily be determined by changing the value of the parameter, the timing of starting a next movement can be properly set in accordance with the operation of the robot. This also increases the operational speed of the robot.

SECOND EMBODIMENT

Next, a second embodiment of the present invention will be described with reference to FIG. 11 through FIG. 15(b).

FIG. 11 is a perspective view showing a robot system used in the second embodiment of the present invention. The robot system used as an assembling system includes a base 35, a pair of orthogonal type robots 40 and 50 which are mounted on the base 35 and each of which has freedom in three axes, and a part supply unit 30 which is guided on the base 35 for linear movement along an additional axis. Therefore, the system is composed of three major working units (i.e., the two robot units and the part supply unit), and has seven movable portions.

The robot 40 is mainly composed of a fixed guide 41 which is mounted on the base 35 and extends in a direction parallel to an x-axis direction, an X-movable body 42 (1st axis) which extends in a Y-axis direction and is moved on the fixed guide 41, and a Y-movable body 43 (2nd axis) which is moved on the X-movable body 42. Further, a Z-movable body 44 (3rd axis) is mounted on the Y-movable body 43 for movement in a Z-axis, and a hand 45 having a pair of fingers 45a is attached to the z-movable body 44.

Similarly, the robot 50 is mainly composed of a fixed guide 51 which is mounted on the base 35 and extends in a direction parallel to the X-axis direction, an X-movable body 52 (4th axis) which extends in the Y-axis direction and is moved on the fixed guide 51, and a Y-movable body 53 (5th axis) which is moved on the X-movable body 52. Further, a Z-movable body 54 (6th axis) is mounted on the Y-movable body 53 for movement in the Z-axis, and a hand 55 having a pair of fingers 55a is attached to the z-movable body 54.

The part support unit 30 comprises a table 31 (7th axis) which is moved along a rail 30a which is parallel to the X-axis direction. At the rear end of the rail 30a, there are provided three part storages 32, 33 and 34 for storing three kinds of parts.

In front of the base 35, a pallet transfer apparatus 36 is disposed in parallel to the Y-axis so as to transfer a pallet in the Y-axis direction.

The assembling system having the above-described structure operates as follows. First, the robots 40 and 50 take out parts from the parts stages 32, 33 and 34, and then assemble them on the table 31 of the part supply unit 30 so as to obtain a first workpiece W1. The table 31 holding the workpiece W1 is moved to a location near the pallet transfer apparatus 36. Subsequently, the robot 40 picks up the workpiece W1 from the table 31, and assembles the workpiece W1 with the second workpiece W2 supported on the pallet 35. A compete workpiece composed of the first and second workpieces W1 and W2 is then transferred by the pallet transfer apparatus 36.

Next, the structure of a numerical controller according to the present embodiment will be described with reference to FIG. 12. The numerical controller is used for controlling the above-described assembling system having seven movable portions corresponding to 1st through 7th control axes. The numeral 80 denotes a central processing unit (CPU). Connected to the CPU 80 are a memory 81, servo CPUs 91–97 and a teaching box 70.

The memory 81 includes various memory areas such as a program area for storing an operational program for controlling the robot, and a data area for storing teaching data and other necessary data. In the program area, there are memorized ten drive tasks 808–817 which are used for moving the movable portions to respective target positions which will be described later. The ten drive tasks 808–817 is composed of three synchronous task 808, 809 and 810, and seven independent tasks 811–817 which correspond to seven control axes, namely, correspond to the seven movable portions of the system. Ten waiting areas 808a–817a corresponding to the ten drive tasks are formed in the memory 81 for storing next target values for the ten drive tasks.

The servo CPUs 91–97 are provided for controlling the servomotors M1–M7 corresponding to 1st to 7th control axes, and operate to calculate differences between target rotational angles $\theta 1$–$\theta 7$ and outputs $\alpha 1$–$\alpha 7$ from encoders E1–E7 coupled to the servomotors M1–M7, and to rotate the servomotors M1–M7 at velocities corresponding to the calculated differences.

The teaching box 70 is used for carrying out teaching operations and for inputting the operational program, and is provided with a display 70a for displaying the operational program and a keyboard 70b for inputting commands and the operational program. The keyboard 70b is provided with a switch for selecting one of the working units, i.e., the robots 40, 50 and the part supply unit 30. Teaching operation is carried out for selected one of the working units.

The operation of the numerical controller according to the second embodiment will now be described.

Similar to the first embodiment, teaching data shown in FIG. 5 are previously input into the memory 81 via the teaching box 70. The teaching data indicate plural teaching points which will become reference points in a moving locus. In this example, there are five teaching points J[0]–J[4], and angles $\theta mn$ of movable portions are detected when the hand of each robot or the table of the part supply unit is moved to each of the teaching points. Thus detected angles are memorized as target values or teaching data. The angles are relative angles from original angles which are output from the encoders E1–E7 when the movable portions are positions at their original or reference positions. The letter "m" affixed to "$\theta$" represents the number of each teaching point and is an integer from 0 to 4, while the letter "n" represents the number of each control axis and is an integer from 1 to 7.

Next, the operation of the CPU 80 will be described with reference to FIGS. 13 through 15(b).

In the numerical controller according to the present embodiment, movements of the seven movable portions are controlled by three control modes. The first control mode is an independent control which is designated by TASK command which is also used in the first embodiment. The second control mode is a first synchronous control in which plural movable portions designated by a command called "TASKS" are moved in a synchronized manner. The third control mode is a second synchronous control in which plural movable portions which are not designated by the TASK command or TASKS command are moved in a synchronized manner. The second synchronous control corresponds to the synchronous control used in the first embodiment.

When a movable portion is designated by the TASK command, the designated movable portion is individually controlled by an executive command such as MOVE command and DRIVE command. Further, when plural movable portions are designated by the TASKS command, the designated movable portions are controlled as a group by synchronous control. In the present embodiment, up to three groups of movable portions can be defined by the TASKS command, and synchronous control is carried out group by group. For example, movable portions corresponding to the 1st, 2nd and 3rd axes are designated to be in the first synchronous control group, while movable portions corresponding to the 4th, 5th and 6th axes are designated to be in the second synchronous control group. In this case, synchronous control is individually carried out for each of the first and second control groups. All of movable portions which are not designated by the TASK command or TASKS command are controlled by synchronous control.

An operational program shown in FIGS. 15(a) and 15(b) are written using these commands. The operational program is successively decoded by the command decoding program shown in FIG. 14. When a MOVE command or DRIVE command is decoded by the command decoding program, a corresponding drive task is effected so as to move a corresponding movable portion. The processing cycle of the CPU 80 is composed of plural processing periods, and the processing periods are assigned to the command decoding program and the ten drive tasks 808–817, respectively, so that the command decoding program and drive tasks are executed in parallel.

Next, the above-mentioned TASK command and TASKS command will be described in more detail. The kind or mode of control set by the TASK command is the independent control. The independent control includes two modes. In one mode, a target value is given by a single axis control command such as DRIVE command. In the other mode, a target value is given by MOVE command. Namely, the TASK command is described as follows:

TASK p ON/q, or TASK p OFF, where p is the number of a control axis for which independent control must be carried out, and q is a parameter. When the description TASK p ON is read out, independent control is designated for p-th control axis, and the designation of the independent control for the p-th control axis is canceled when the description TASK p OFF is read out. The parameter q indicates the manner in which a target value is given to the independent task. When q=0, a target value is given using a single axis control command. When q=1, a target value is given using MOVE command without using the single axis control command.

On the other hand, the TASKS command is described as follows:

TASKS p ON/q, or TASKS p OFF, where p is the number of a control axis for which synchronous control must be carried out, and q is a parameter. When the description TASK p ON is read out, p-th control axis is designated for synchronous control in a designated control group. When the description TASKS p OFF is read out, the q-th axis is removed from the designated control group. The parameter q is used for designating a synchronous control group to which a movable portion belongs. When the movable portions corresponding to the 1st, 2nd and 3rd axes must be controlled by synchronous control, these movable portions must be controlled by a common synchronous task. When q=0, the p-th axis belongs to the first synchronous control group which is controlled by the synchronous task 808. When q=1, the p-th axis belongs to the second synchronous control group which is controlled by the synchronous task 809. Synchronous control for other movable members is carried out by the synchronous task 810.

The processing for the MOVE command, which is an important command in this embodiment, will now be described with reference to FIG. 14, and FIG. 9. The MOVE command is used together with the number of a teaching point, for example, MOVE J[0] as shown in the line 10 of the operational program.

The MOVE command is decoded in step 100, and processing for the MOVE command is executed in steps 110 through 116. In step 110, the statuses of control flags formed in the memory 81 are read so as to select a desired drive task form the drive tasks 808–817 based on the statuses of the control flags. Namely, when it is judged based on the status of the control flags that the 1st through 3rd axes belong to the first synchronous control group must be controlled by synchronous control, the 4th through 6th axes belong to the second synchronous control group must be controlled by synchronous control, and only the 7th axis must be controlled by independent control, the synchronous tasks 808 and 809 and the independent task 817 are selected. The status of the control flags are set and reset by the above-mentioned TASK command and TASKS command.

In step 112, it is judged whether or not the drive task or drive tasks selected in step 110 are presently executed. When the selected drive task or drive tasks are presently executed, or when the result of the judgment is affirmative, it is impossible to effect a movement commanded by the MOVE command. In this case, the processing moves to step 114, in which the target value or target values are stored in a corresponding waiting areas. For example, in the case where the present MOVE command for movement toward the teaching point J[1] is carried out by the synchronous task 810, which is still executed in accordance the preceding command for movement toward the teaching point J[0], the movement toward J[1] cannot be started. In such a case, the target values of the teaching point J[1] are stored in the waiting areas 810a for the synchronous task 810, which makes it possible to start the movement toward J[1] immediately after the termination of the movement toward J[0].

On the other hand, when the selected drive task or drive tasks are not presently executed, or when the result of the judgment in step 112 is negative, the target values of the present MOVE command are given to the corresponding drive task or tasks.

Next, an explanation will be give to the execution of each of the drive tasks 808–817 to which target values are given in steps 114 and 116. As will be explained below, the processing for each of the drive tasks 808–817 is basically the same.

In step 200 of the flowchart shown in FIG. 9, a velocity pattern is calculated which is used for moving a movable portion to a target position corresponding to a target value given in step 116, and command signals are generated based on the velocity pattern. Namely, for each of the synchronous tasks 808, 809 and 810, a velocity pattern in each control axis is calculated based on the maximum velocity and maximum acceleration which are determined based on a servomotor used for the control axis, and teaching data, i.e., a distance between the present position to a next teaching point designated by a command. Subsequently, the velocity patters are modified, by using a control axis in which the deceleration start time is the latest, and a control axis in which the acceleration/deceleration time is the longest as reference axes. Command angles are generated for all the control axes based on the modified velocity patterns.

For each of the independent tasks 811-817, a velocity pattern is determined based on the maximum velocity and maximum acceleration set for the corresponding independent axis, without being affected by the maximum velocities and maximum accelerations of other control axes. Therefore, it is possible to generate command angles which maximally use the capacities of the servomotors, thereby increasing the moving speeds of the movable portions.

After the Completion of the processing in step 200, the processing moves to step 202, in which it is judged whether or not a next target value exists in a corresponding one of the waiting areas 808a-817a for the drive tasks 808-817. When a next target value exists in the corresponding one of the waiting area 808a-817a, or the result of the judgment in step 202 is affirmative, the processing moves to step 204 in which the next target value is read out from the corresponding waiting area. The processing then moves back to step 200 so that command angles are generated based on the read out target value. When a next target value does not exist in the corresponding one of the waiting area 808a-817a, or the result of the judgment in step 202 is negative, the processing for the drive tasks is ended. As described above, the drive tasks 808-817 are independently initiated.

Next, the operation program shown in FIGS. 15(a) and 15(b) will be described.

As shown by the time chart in FIG. 13, the operational program shown in FIGS. 15(a) and 15(b) is programmed in such a way that during the movement to the teaching point J[1] via the teaching the teaching point J[0], the movable portions corresponding to the 1st through 3rd axes are control by synchronous control as a first synchronous control group, the movable portions corresponding to the 4th through 6th axes are control by synchronous control as a second synchronous control group, and only the movable portions corresponding to the 7th axis is moved by independent control. At the teaching point J[1], all the movable portions are synchronized. Subsequently, all the movable portions are moved toward a teaching point J[2], during which all the movable portions are controlled by synchronous control. During the movement from the teaching point J[2] to the teaching point J[4] via the teaching point [3], the movable portions corresponding to the 1st through 6th axes are controlled by synchronous control, and only the movable portion corresponding to the 7th axis is moved by independent control.

In the above-described movement, the synchronous control (second synchronous control) used for movements from the teaching point J[1] to the teaching point J[2] is the same as the synchronous control used in the first embodiment. This synchronous control is used in the case where all the working units (robots and part supply unit) of the assembling system must cooperate to carry out a common work in which the working units must trace proper moving loci accurately. The plurality of synchronous controls for the two control groups and the independent control during the movement from the origin to the teaching point J[1], and the movement from the teaching point J[2] to the teaching point J[4] are used for moving each of the working units at a high speed. Especially, during the movement from the teaching point J[2] to the teaching point J[4], both of the robots 40 and 50 are operated in a synchronized manner, but only the part supply unit 30 is independently moved. Therefore, the part supply unit 30 can be moved simultaneously with the assembly operation by the robots.

Next, the processing for the operational program shown in FIGS. 15(a) and 15(b) will be described with reference to the flowchart shown in FIG. 14.

Part of the operational program which is not related directly to the present invention is omitted from the operational program shown in FIGS. 15(a) and 15(b).

When the description TASKS p ON/q (p=1-6, q=0 or 1) in each of the lines 10 through 60 is decoded in step 107, the processing moves to step 150 in which control flags in the memory 81 are set so as to memorize the control state where the movable portions corresponding to the 1st through 3rd axes belong to the first synchronous control group which is controlled by the synchronous task 808, and the movable portions corresponding to the 4th through 6th axes belong to the second synchronous control group which is controlled by the synchronous task 809. Further, when the description TASK 7 ON/0 in the line 70 is decoded in step 102, the processing moves to step 120 in which a control flag in the memory 81 is set so as to memorize the control state where the movable portion corresponding to the 7th axis is controlled by independent control. In this case, since the parameter is "0", it is also memorized that a target value is given by a single axis control command, i.e., by the DRIVE command in the line 100.

The MOVE commands in the lines 80 and 90 are decoded in step 100, and the below-described process is carried out in steps 110-116. In this case, before starting the movement in accordance with the description MOVE J[0], the control state is set by the TASKS commands and the TASK command in such a way that the first and second synchronous groups designated by the TASKS commands are independently controlled by synchronous control, and the movable portion corresponding to the 7th axis is controlled by independent control. Therefore, the movable portions corresponding to the 1st through 3rd axes are controlled by the synchronous task 808, and the movable portions corresponding to the 4th through 6th axes are controlled by the synchronous task 809. In other word, the first synchronous control group and second synchronous control group are individually controlled using the target values of the teaching points J[1] and J[2]. When the MOVE command in line 80 is decoded, neither one of the synchronous tasks 808 and 809 has been started. Therefore, the result of judgment in step 112 becomes negative, and the target values of the teaching point J[0] are given to the synchronous tasks 808 and 809 which are then executed using these target values. On the other hand, when the MOVE command in the line 90 is decoded, the movement toward the teaching point J[0] has not been completed, i.e., the synchronous tasks 808 and 809 are still executed. Therefore, the result of judgment in step 112 becomes affirmative, and the target values of the teaching point J[1] are stored in the waiting areas 808a and 809a corresponding to the synchronous tasks 808-809 in step 114.

When the movement toward the teaching point J[0] has been completed, the target values of the teaching point J[1] are read out, and the movement toward the teaching point J[1] is subsequently carried out. As shown in FIG. 13, the first synchronous control group including the 1st through 3rd axes starts its movement between the teaching point J[0] and teaching point J[1] at a timing which differs from the timing at which the second synchronous control group including the 4th through 6th axes starts its movement between the teaching point J[0] and the teaching point J[1]. Accordingly, each of the robots can be operated at a high speed without being restricted by the capacity of the other robot.

Subsequently, the DRIVE command in the line 100 is decoded in step 106, and is executed in step 140. The DRIVE command is a single axis control command, and is described as follows:

DRIVE a, b wherein "a" represents the number of a designated axis, and "b" represents a target value. When "a" is 7, "b" is 500, the independent task 817 corresponding to the 7th axis is executed so that the part supply unit 30 (7th axis) is relatively moved from the present position by 500 mm. Accordingly, the two synchronous tasks 808 and 809 started by the commands in the lines 80 and 90, and the independent task 817 started by the command in the line 100 are executed in parallel. By these tasks, the robots 40 and 50 and the part supply unit 30 are independently operated.

The SYNC commands in the lines 110 through 130 are decoded in step 104, and executed in step 130. The SYNC command is used for eliminating differences in timings of starting the movements in the control axes toward a next teaching point, thereby synchronizing a certain synchronous control group with another synchronous control group, or synchronizing a certain independent control axis with other axes. In the present embodiment, the movement toward the teaching point J[2] must be carried out by controlling the 1st through 7th axes by synchronous control. Therefore, the all the control axes are synchronized when the movement toward the teaching point J[1] has been completed.

In the description SYNC i, J used for SYNC command, "i" indicates the number of a control axis used as a reference axis. When i=11, it is indicated that the first synchronous control group controlled by the synchronous task 808 is used as a reference for synchronization. When i=22, it is indicated that the second synchronous control group controlled by the synchronous task 809 is used as a reference for synchronization. The "J" indicates a parameter. When the SYNC command is fetched, the drive tasks 808–817 have not been started until the i-th axis falls in the state designated by the parameter j. The parameter J can be one of the following values:

0: A timing when movement in the designated axis ends;

1: A timing when output of command signals for the designated axis is completed;

2: A timing when the designated axis starts deceleration; and

3: A timing when a combined movement is started in the designated axis.

These four parameters are used for carried out synchronization at timings shown in FIG. 7. When the parameter is 0, a next command is executed when the angular position detected by the encoder of a designated axis completely coincides with a commanded rotational angle indicated by a target value. When the parameter is 1, a next command is executed when the CPU 80 stops outputting command signals indicating commanded rotational angles. When the parameter is 2, a next command is executed when the designated axis starts deceleration. When the parameter is 3, a next command is executed when combining of the Velocity patters is started in the designated axis for continuously carrying out a movement toward a next teaching point.

In the present embodiment, since the parameters of the commands in the lines 110 through 130 are "0", a next command is not executed until the movable portions corresponding to the first and second synchronous control group and the movable portion corresponding to the 7th axis reaches the respective target positions indicated by the target values of the teaching point J[1]. Since the movable portions corresponding the second synchronous control group (4th through 6th axes) takes the longest time to reach the teaching point J[1], as shown in FIG. 13, synchronization is carried out by using the second synchronous control group as a reference.

The description TASKS p OFF (p=1–6) in each of the lines 140 through 190 is decoded in step 107, and the TASKS command is executed in step 150. The description TASK 7 OFF in the lines 200 is decoded in step 102, and the TASK command is executed in step 120. These commands cancel the synchronous control for the first and second synchronous control groups, and the individual control previously set by the commands in the lines 10 through 70. Therefore, by the program from the line 140 through 200, the control modes of the 1st through 7th axes are changed to the second synchronous control which is carried out by the synchronous task 810. Namely, when MOVE command is executed in accordance with the description MOVE J[2] in the line 210, all the movable portions corresponding to the 1st through 7th axes simultaneously start their movements, and simultaneously complete the movements.

The description TASK 7 ON/0 in the line 220 is the same as that in the line 70, and indicates that the movable portion corresponding to the 7th control axis must be controlled by independent control. In this case, since the parameter is "0", it is also memorized that the 7th axis is controlled by a single axis control command, i.e., the DRIVE command in the line 250.

When the MOVE commands in the lines 230 and 240 are executed, the movable portions corresponding to the 1st through 6th axes are moved by the second synchronous control so as to move to the teaching point J[4] through the teaching point J[3] while the movable portion corresponding to the 7th axis is individually controlled by the DRIVE command in the line 250 so that the part supply unit 30 is moved from the present position by 500 mm in the negative direction.

Due to the SYNC command in the line 260 in which the parameter is set to "0", the execution of the operational program is temporarily halted until the movement toward the teaching point J[4] in the 7th axis is completed, i.e., until the movement of the part supply unit 30 is completed. Subsequently, the designation of the independent control for the 7th axis is canceled by the TASK command in the line 270. When the END command in the line 280 is decoded in step 108, the operation of the robot is ended.

As described above, the numerical controller according to the present embodiment has the capability of simultaneously carrying out plural synchronous control for plural groups of control axes, as well as the capability of freely changing the control mode of each control axis between the synchronous control mode and individual control mode. Accordingly, the numerical controller can easily change the control state between the first state in which plural working units such as robots corporate with each other and the second state in which the working units operate independently. Therefore, an accurate work can be accomplished by the cooperated operation while a high speed operation can be carried out by the independent operation.

Obviously, numerous modifications and variations of the present invention are possible in light of the above teachings. It is therefore to be understood that within the scope of the appended claims, the present invention may be practiced otherwise than as specifically described herein.

What is claimed is:

1. An apparatus for numerically controlling an industrial machine having at least three movable portions which are controlled in a synchronized manner, said apparatus comprising:

designation means for selectively designating a variable number of said movable portions;

independent control means for moving the designated movable portions in a predetermined manner independently from each other and from other movable portions which are not designated by said designation means; and synchronous control means for moving said other movable portions in a synchronized manner.

2. An apparatus for numerically controlling an industrial machine according to claim 1, wherein said synchronous control means comprises means for controlling said other movable portions to simultaneously start and complete their movements and to simultaneously accelerate and decelerate said other movable portions.

3. An apparatus for numerically controlling an industrial machine according to claim 2, wherein said independent control means accelerates the designated movable portion at a maximum acceleration thereof and then moves the designated movable portion at a maximum velocity thereof.

4. An apparatus for numerically controlling an industrial machine according to claim 1, wherein said apparatus further comprises means for defining at least two groups of movable portions, and said synchronous control means controls movable portions belonging to each group independent from the other group.

5. An apparatus for numerically controlling an industrial machine according to claim 1, wherein said apparatus further comprises means for synchronizing the movement of said designated movable portion which is moved by said independent control means with the movements of said other movable portions which are moved by said synchronous control means, after the completion of all the movements.

6. A method of numerically controlling an industrial machine having at least three movable portions which are controlled in a synchronized manner, said method comprising the steps of:

obtaining information which designates variable number of selected movable portions to be excluded from synchronous control;

identifying the designated movable portions based on the information;

moving the designated movable portions in a predetermined manner independently from each other and from other movable portions which are not designated; and moving said other movable portions in a synchronized manner.

7. A method of numerically controlling an industrial machine according to claim 6, wherein said other movable portions are controlled to simultaneously start and complete their movements and to simultaneously start acceleration and deceleration.

8. A method of numerically controlling an industrial machine according to claim 7, wherein said designated movable portion is accelerated at a maximum acceleration thereof and then moved at a maximum velocity thereof.

9. A method of numerically controlling an industrial machine according to claim 6, wherein said method further comprises the step of obtaining another information defining at least two groups of movable portions, and movable portions belonging to each group is moved in a synchronized manner independent from the other group.

10. A method of numerically controlling an industrial machine according to claim 6, wherein said method further comprises the step of synchronizing the movement of said designated movable portion which is independently moved with the movements of said other movable portions which are synchronously moved, after the completion of all the movements.

* * * * *